United States Patent
Fu et al.

(10) Patent No.: US 9,923,485 B2
(45) Date of Patent: Mar. 20, 2018

(54) MULTI-CHANNEL INVERTER SYSTEMS

(71) Applicant: Futurewei Technologies, Inc., Plano, TX (US)

(72) Inventors: Dianbo Fu, Plano, TX (US); Yunfeng Liu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/933,723

(22) Filed: Nov. 5, 2015

(65) Prior Publication Data

US 2017/0133947 A1 May 11, 2017

(51) Int. Cl.
*H02M 7/537* (2006.01)
*H02M 7/487* (2007.01)
*H02M 7/49* (2007.01)

(52) U.S. Cl.
CPC .......... *H02M 7/537* (2013.01); *H02M 7/487* (2013.01); *H02M 7/49* (2013.01)

(58) Field of Classification Search
CPC ...... H02M 7/003; H02M 7/537; H02M 7/538; H02M 7/5387; H02M 2007/4815; Y02B 70/1441
USPC .... 363/21.01–21.18, 37, 56.05, 65, 71, 131, 363/132
See application file for complete search history.

(56) References Cited

U.S. PATENT DOCUMENTS

| | | | | |
|---|---|---|---|---|
| 3,648,149 A | * | 3/1972 | Brown | H02M 7/49 363/43 |
| 6,545,450 B1 | * | 4/2003 | Ledenev | G06F 1/26 323/272 |
| 9,281,761 B2 | * | 3/2016 | Wagoner | H02M 7/5387 |
| 9,385,632 B2 | * | 7/2016 | Hu | H02M 7/487 |
| 2014/0159481 A1 | | 6/2014 | Hubert | |

FOREIGN PATENT DOCUMENTS

| | | |
|---|---|---|
| CN | 102570830 A | 7/2012 |
| CN | 103368427 A | 10/2013 |
| CN | 103475248 A | 12/2013 |

OTHER PUBLICATIONS

Fan, S.-Y., et al., "Design and Implementation of Multi-channel Land Fowls Stunner with Current Sharing Controller," Applied Power Electronics Conference and Exposiition, Feb. 21-25, 2010, pp. 1842-1848.

\* cited by examiner

*Primary Examiner* — Yemane Mehari
(74) *Attorney, Agent, or Firm* — Slater Matsil, LLP

(57) ABSTRACT

A system comprises a first T-type inverter connected to a dc power source, a second T-type inverter connected to the dc power source, wherein the second T-type inverter is configured to operate with a first phase shift from the first T-type inverter, a third T-type inverter connected to the dc power source, wherein the third T-type inverter is configured to operate with a second phase shift from the second T-type inverter, a coupled inductor having a first input, a second input and a third input connected to the first T-type inverter, the second T-type inverter and the third T-type inverter respectively and an output filter coupled to the output of the coupled inductor.

20 Claims, 7 Drawing Sheets

MULTI-CHANNEL INVERTER SYSTEMS

TECHNICAL FIELD

The present invention relates to an apparatus, system and method for load balancing among multiple inverter units connected in parallel, and, in particular embodiments, to an apparatus, system and method for load balancing through a coupled inductor placed between parallel operated inverter units and an output filter.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. In order to attenuate undesirable harmonics, a plurality of magnetic devices may be coupled between the solar inverter and the ac power source.

A magnetic device typically includes a magnetic core formed of suitable magnetic materials such as ferrite, powder iron and/or the like. The magnetic device may further include a conductive winding or a plurality of conductive windings. The windings and the current flowing through the windings may generate a magnetic field, which is also known as magnetic flux. In a normal design, the magnetic core usually has a relatively high permeability in comparison with the surrounding medium (e.g., air). As a result, the magnetic flux is confined with the magnetic core, which forms a closed flux path. The magnetic flux provides a medium for storing, transferring or releasing electromagnetic energy.

Coupled inductors are widely used in the power electronics industry. A coupled inductor may comprise two windings magnetically coupled to each other. The two coupled windings may be wound on a same magnetic core (e.g., a toroid core). The first winding generates a first magnetic force, which drives a first magnetic field or flux. The flux generated by the first winding is confined with the magnetic core, which forms a closed flux path. Likewise, the second winding generates a second magnetic force, which drives a second magnetic field, which is confined with the magnetic core. The magnetic material of the magnetic core of a coupled inductor may be of a magnetic permeability greater than that of a surrounding medium (e.g., air). However, the coupling between two windings of the coupled inductor is not perfect. There may be a leakage path between the winding and the surrounding medium having a lower magnetic permeability.

SUMMARY

These and other problems are generally solved or circumvented, and technical advantages are generally achieved, by preferred embodiments of the present invention which provide a multi-channel inverter.

In accordance with an embodiment, a system comprises a first inverter comprising a plurality of power processing channels coupled between an input dc power source and a first coupled inductor, wherein each channel is configured to invert a dc waveform into an ac waveform with a phase shift equal to 360 degrees divided by N, wherein N is an odd integer, the first coupled inductor comprising a plurality of windings, wherein each winding has a first terminal connected to a corresponding power processing channel and second terminals of the plurality of windings are connected together and an output filter having an input connected to the second terminals of the plurality of windings.

In accordance with another embodiment, a system comprises a first T-type inverter connected to a dc power source, a second T-type inverter connected to the dc power source, wherein the second T-type inverter is configured to operate with a first phase shift from the first T-type inverter, a third T-type inverter connected to the dc power source, wherein the third T-type inverter is configured to operate with a second phase shift from the second T-type inverter, a coupled inductor having a first input, a second input and a third input connected to the first T-type inverter, the second T-type inverter and the third T-type inverter respectively, wherein the coupled inductor comprises a magnetic core comprising a first leg, a second leg and a third leg, a first winding wound around the first leg, a second winding wound around the second leg and a third winding wound around the third leg, wherein output terminals of the first winding, the second winding and the third winding are connected together to form an output of the coupled inductor and an output filter coupled to the output of the coupled inductor.

In accordance with yet another embodiment, a three-phase inverter system comprises a first phase comprising a plurality of first inverters connected together through a first coupled inductor, wherein the first coupled inductor comprises a plurality of first windings negatively coupled to each other and the plurality of first inverters are configured to operate with a phase shift from one another, a second phase comprising a plurality of second inverters connected together through a second coupled inductor, a third phase comprising a plurality of third inverters connected together through a third coupled inductor and a fourth coupled inductor having a first winding connected between the first coupled inductor and a first output filter, a second winding connected between the second coupled inductor and a second output filter and a third winding connected between the third coupled inductor and a third output filter.

An advantage of an embodiment of the present invention is a multi-channel inverter providing higher efficiency as well as lower total harmonic distortion (THD).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a coupled inductor structure for connecting a plurality of inverter units of a phase of a dc/ac power system. Furthermore, the coupled inductor structure may be employed to connect three phases of the dc/ac power system. The invention may also be applied, however, to a variety of dc/ac power systems. Hereinafter, various embodiments will be explained in detail with reference to the accompanying drawings.

Figure 1:
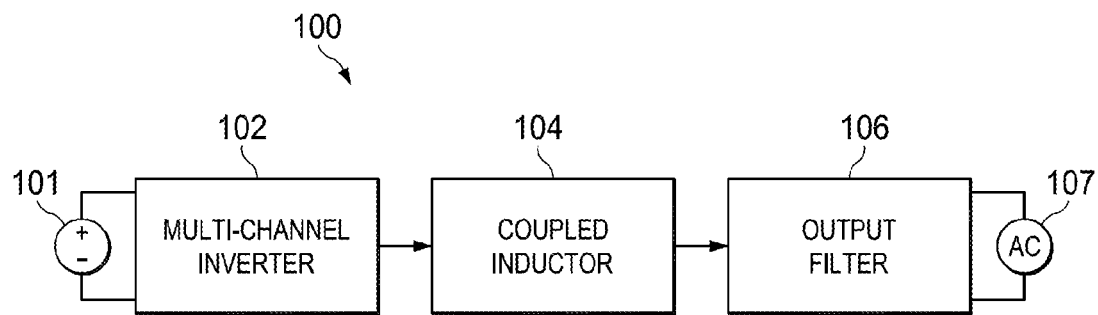
FIG. 1 illustrates a block diagram of a multi-channel inverter system having a coupled inductor in accordance with various embodiments of the present disclosure.

FIG. 1 illustrates a block diagram of a multi-channel inverter system having a coupled inductor in accordance with various embodiments of the present disclosure. The multi-channel inverter system 100 comprises an input dc power source 101, a multi-channel inverter 102, a coupled inductor 104, an output filter 106 and an ac power source 107. In some embodiments, the multi-channel inverter 102 may comprises a plurality of power processing channels. Each channel may be implemented as a dc/ac inverter. The channels in the multi-channel inverter 102 are connected in parallel through the coupled inductor 104. More particularly, the inputs of each channel are connected to the input dc power source 101 and the output of each channel is connected to an input of the output filter 106 through a winding of the coupled inductor 104. Equal current sharing may be achieved through the coupled inductor 104. Throughout the description, the channels of the multi-channel inverter 102 may be alternatively referred to as the inverter units of the multi-channel inverter 102.

Each inverter unit of the multi-channel inverter 102 inverts a dc waveform received from the input dc power source 101 to an ac waveform. In some embodiments, each inverter unit may comprise a plurality of switching elements such as insulated gate bipolar transistor (IGBT) devices. Alternatively, each inverter unit may include other types of controllable devices such as metal oxide semiconductor field effect transistor (MOSFET) devices, bipolar junction transistor (BJT) devices, super junction transistor (SJT) devices, bipolar transistors and/or the like. The detailed operation and structure of the inverter units of the multi-channel inverter 102 will be described below with respect to FIG. 2.

In some embodiments, each channel is configured to invert a dc waveform into an ac waveform with a phase shift. The phase shift of each power processing channel is equal to 360 degrees divided by N, where N is the order of the most significant harmonic of the multi-channel inverter system 100. In some embodiments, N is an odd integer such as 5, 7 and the like.

The coupled inductor 104 may comprise a plurality of windings magnetically coupled to each other. In some embodiments, the plurality of windings may be negatively coupled to each other. The plurality of coupled windings may be wound on a same magnetic core (e.g., a toroid core). First terminals of the plurality of coupled windings are connected to their respective channels and second terminals of the plurality of coupled windings are connected together and further connected to the input of the output filter 106. Furthermore, the coupling among the plurality of windings may generate leakage magnetic flux. In an equivalent circuit of a coupled inductor, the leakage magnetic flux is replaced by a leakage inductance. Such a leakage inductance may be employed to replace some inductive elements of the output filter 106. The structure of the coupled inductor 104 will be described in detail below with respect to FIGS. 2-5.

The output filter 106 may comprise a plurality of inductive and capacitive elements. In some embodiments, the inductive and capacitive elements may form an L-C filter or a plurality of L-C filters connected in cascade. The inductive elements (e.g., inductors) provide high impedance to prevent high frequency noise from flowing out of the multi-channel inverter system 100. At the same time, the capacitive elements (e.g., capacitors) shunt the input of the ac power source 107 and provide a low impedance channel for the high frequency noise generated from the inverter units. The detailed structure of the output filter 106 will be described below with respect to FIGS. 2-5.

Figure 2:
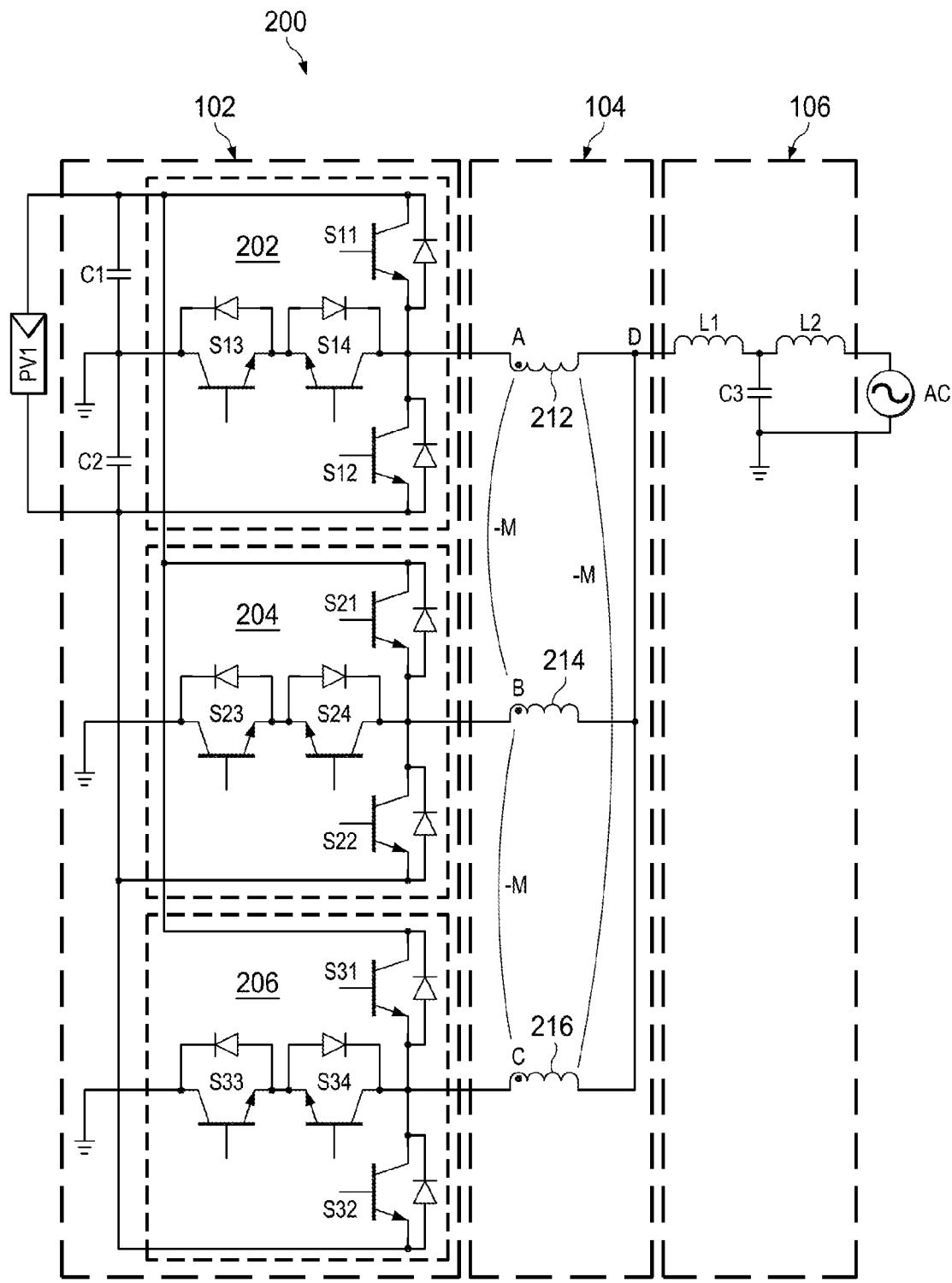
FIG. 2 illustrates a schematic diagram of a first implementation of the multi-channel inverter system shown in FIG. 1 in accordance with various embodiments of the present disclosure.

FIG. 2 illustrates a schematic diagram of a first implementation of the multi-channel inverter system shown in FIG. 1 in accordance with various embodiments of the present disclosure. An input dc voltage source PV1 is coupled to the inputs of the multi-channel inverter 102. In order to filter input noise, input capacitors (e.g., C1 and C2) are connected between the two output terminals of the input dc voltage source PV1. More particularly, the input capacitors may comprise a first input capacitor C1 and a second input capacitor C2. The first input capacitor C1 and the second input capacitor C2 are connected in series and further coupled between the two terminals of the input dc voltage source PV1. The common node of the first input capacitor C1 and the second input capacitor C2 is connected to a neural point as shown in FIG. 2. In some embodiments, the neural point is the ground of the multi-channel inverter system 200.

The multi-channel inverter 102 comprises a first inverter unit 202, a second inverter unit 204 and a third inverter unit 206. The inputs of the inverter units 202, 204 and 206 are connected to the input dc voltage source PV1. The outputs of the inverter units 202, 204 and 206 are connected to the three input terminals of the coupled inductor 104 respectively.

The inverter units 202, 204 and 206 shown in FIG. 2 are commonly known as T-type three-level inverters. It should be noted that while FIG. 2 shows the inverter units 202, 204 and 206 are T-type three-level power inverters, it is within the scope and spirit of the invention for the multi-channel inverter system 200 to comprise other inverters, such as, but no limited to two-level inverters, three-level inverters, resonant inverters, any combinations thereof and/or the like.

In some embodiments, the inverter units 202, 204 and 206 may be of a same structure such as the T-type three-level inverter structure shown in FIG. 2. For simplicity, only the detailed structure of the first inverter unit 202 will be described below.

The first inverter unit 202 comprises a pair of switching elements S11 and S12 connected in series. The common node of the switching elements S11 and S12 are coupled to ground through an isolation device formed by back-to-back connected switching elements S13 and S14. The back-to-back connected switching elements S13 and S14 are capable of completely isolating the common node of the switching elements S11 and S12 from ground. According to some embodiments, switching elements S11, S12, S13 and S14 are IGBT or IGBTs connected in parallel, series and any combinations thereof.

Switching elements S11, S12, S13 and S14 are so controlled that the output of the first inverter unit 202 generates a three level waveform. In particular, when switching element S11 is turned on and switching element S12 is turned off, the output of the first inverter unit 202 generates a positive voltage equal to one half of the voltage of the input dc voltage source PV1. Likewise, when switching element S12 is turned on and switching element S11 is turned off, the output of the first inverter unit 202 generates a negative voltage equal to one half of the voltage of the input dc voltage source PV1. When both switching elements S11 and S12 are turned off and switching elements S13 and S14 are turned on, the output of the first inverter unit 202 is coupled to ground. As such, the output of the first inverter unit 202 generates a three-level voltage waveform. The frequency of the three-level voltage waveform is approximately 60 HZ in accordance with an embodiment.

Furthermore, the switching elements (e.g., S11, S12, S13 and S14) of each inverter unit shown in FIG. 2 are so controlled that there is a phase shift between two output waveforms. For example, by controlling the timing of the switching elements S11-S14 and the timing of the switching elements S21-S24, a first phase shift may be placed between the output of the first inverter unit 202 and the second inverter unit 204. Likewise, by controlling the timing of the switching elements S21-S24 and the timing of the switching elements S31-S34, a second phase shift may be placed between the output of the second inverter unit 204 and the third inverter unit 206. Due to the first phase shift and the second phase shift, the voltage waveform at the output of the coupled inductor 104 is not a three-level waveform. Instead, the voltage waveform at the output of the coupled inductor 104 is a multi-level waveform. The number of levels of the multi-level waveform may vary depending on the degrees of the phase shifts. In some embodiments, the number of levels of the multi-level waveform is equal to seven. An example of a seven-level waveform is shown in FIG. 8.

Figure 8:
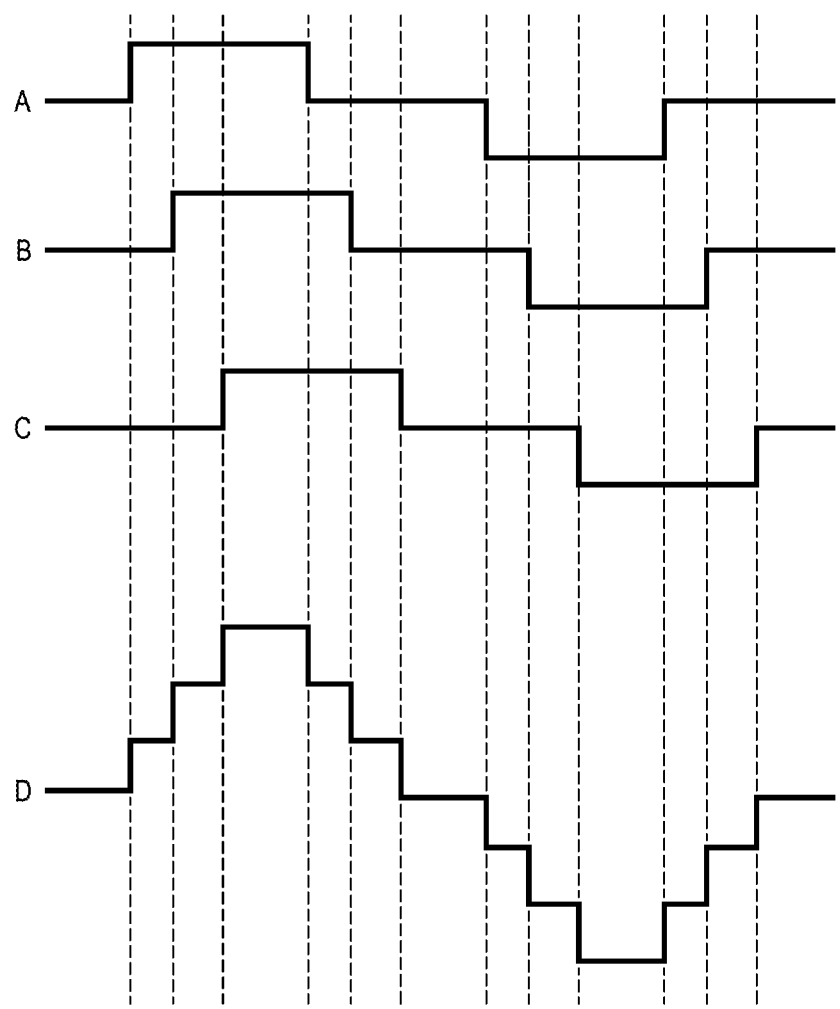
FIG. 8 illustrates a multi-level waveform of the multi-channel inverter system shown in FIG. 2 in accordance with various embodiments of the present disclosure.

One advantageous feature of having the multi-level waveform (e.g., waveform D in FIG. 8) of the output of the coupled inductor 104 is that the multilevel waveform shown in FIG. 8 follows the sinusoidal waveform. As a result, the harmonic contents are less. For example, by selecting the phase shift, a dominant harmonic such as the fifth harmonic may be eliminated. Another advantageous feature of having the multi-level waveform (e.g., waveform D in FIG. 8) is that the multilevel waveform helps to simplify the design of the output filter 106. The detailed structure of the simplified output filter will be described below with respect to FIGS. 4-5.

It should be noted that the inverter units 202, 204 and 206 and the coupled inductor 104 shown in FIG. 2 are merely examples, one person skilled in the art will realize that the inverters (e.g., inverter units 202-206) as well as its corresponding coupled inductor 104 may be implemented in many different ways. For example, the multi-channel inverter system 200 may accommodate more than three inverter units. Accordingly, the coupled inductor 110 may comprise multiple windings, each of which is connected to one output of a corresponding inverter unit.

The coupled inductor 104 comprises three windings. A first winding 212 is connected between node A and node D as shown in FIG. 2. A second winding 214 is connected between node B and node D. A third winding 216 is connected between node C and node D. As shown in FIG. 2, the dot of each winding denotes the polarity of the winding. As shown in FIG. 2, the first winding 212 is negatively coupled to the second winding 214 with a coupling coefficient of M. Likewise, the second winding 214 is negatively coupled to the third winding 216 with a coupling coefficient of M. The third winding 216 is negatively coupled to the first winding 212 with a coupling coefficient of M. M is a predetermined number. It may vary depending on different design needs. The detailed implementation of these three negatively coupled inductors will be described below with respect to FIG. 6.

In some embodiments, the coupled inductor 104 helps the multi-channel inverter system 200 distribute energy evenly between the first inverter unit 202, the second inverter unit 204 and the third inverter unit 206. In particular, the balance between these three inverter units is determined by the magnetizing inductances of the coupled inductor 104. In order to achieve a balanced energy distribution among these three inverter units, the magnetizing inductances are designed to have a large value. As a result, the variations of the magnetizing inductances are relatively small. Such small variations help the multi-channel inverter system 200 achieve both static current sharing and dynamic current sharing.

The output filter 106 may comprise a first inductor L1 and a second inductor L2 connected in series and further coupled between the coupled inductor 104 and the output ac source. The output filter 106 may further comprise a plurality of output capacitors coupled between the common node of the first inductor L1 and the second inductor L2, and ground. The plurality of output capacitors are collectively shown as a capacitor C3 in FIG. 1.

The first inductor L1 and the second inductor L2 provide high impedance when high frequency noise tries to flow out of the multi-channel inverter system 200. At the same time, the capacitor C3 shunts the input of the ac source and provides a low impedance channel for the high frequency noise generated from the multi-channel inverter system 200. As a result, the high frequency noise of the inverter units 202, 204 and 206 may be prevented from passing through the output filter 106.

It should be noted that the inverter topologies, the output filter 106, the input dc power source PV1 and the output ac power source shown in FIG. 2 are provided for illustrative purposes only, and are provided only as examples of various embodiments. Such examples should not unduly limit the scope of the claims. One of ordinary skill in the art would recognize many variations, alternatives, and modifications.

Figure 3:
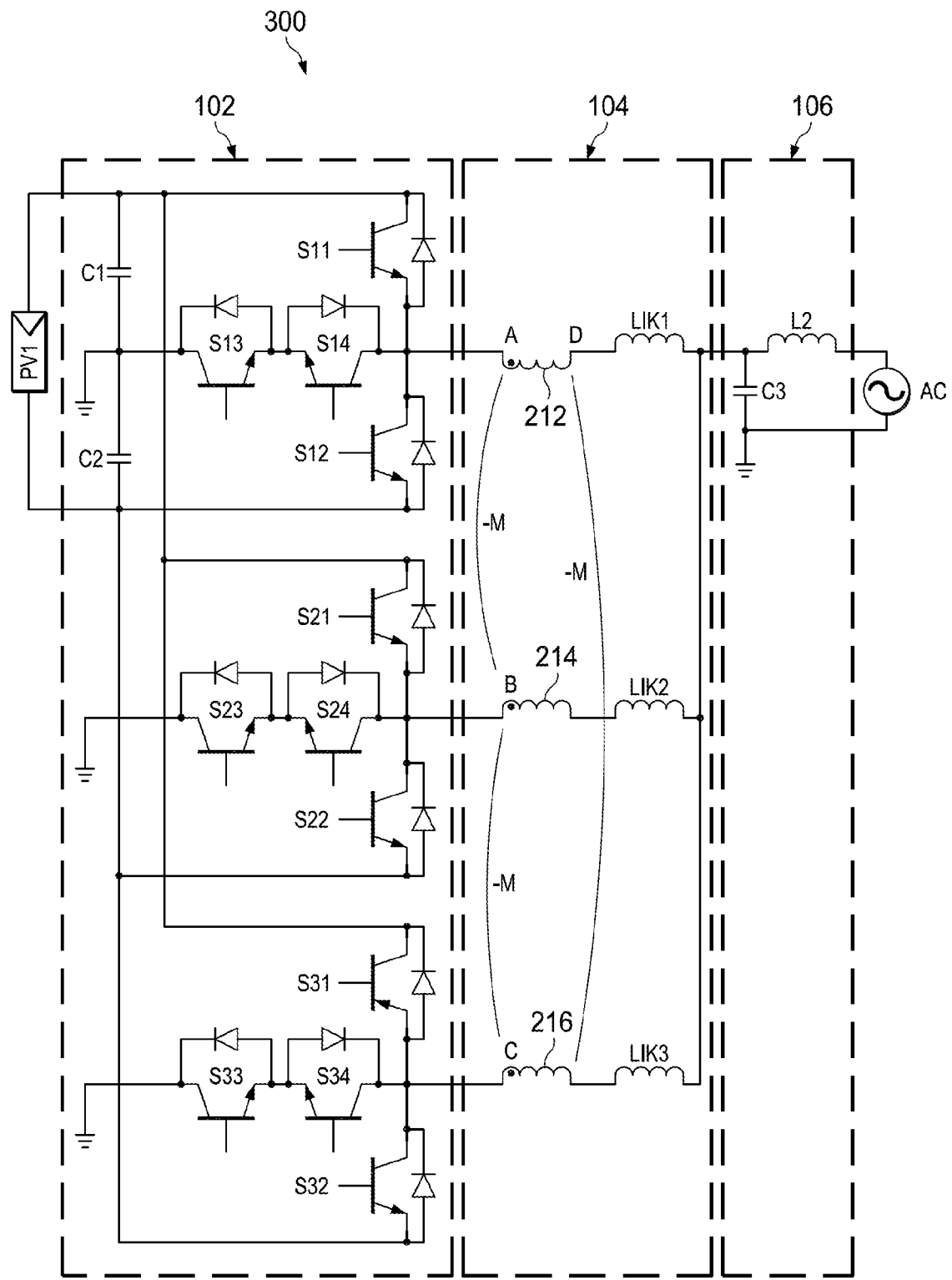
FIG. 3 illustrates a schematic diagram of a second implementation of the multi-channel inverter system shown in FIG. 1 in accordance with various embodiments of the present disclosure.

FIG. 3 illustrates a schematic diagram of a second implementation of the multi-channel inverter system shown in FIG. 1 in accordance with various embodiments of the present disclosure. The multi-channel inverter system 300 shown in FIG. 3 is similar to that shown in FIG. 2 except that the first inductor L1 has been replaced by the leakage inductance of the coupled inductor 104. Since the voltage at the output of the coupled inductor 104 is a multilevel waveform following the sinusoidal waveform, the harmonic content is reduced accordingly. Such a low harmonic content helps to simplify the design of the output filter 106. In some embodiments, the inductance of the first inductor L1 may be reduced by 90%. In some embodiments, the inductance of the first inductor L1 is equal to about 10 uH. Such a small inductance can be replaced by the leakage inductance of the coupled inductor 104. In other words, the first inductor L1 can be integrated into the coupled inductor 104.

The magnetic material of the magnetic core may be of a magnetic permeability greater than that of a surrounding medium (e.g., air). However, the coupling between two inductors of the coupled inductor 104 may be not perfect. The coupling between the winding and the surrounding medium may generate leakage magnetic flux. All three inductors of the coupled inductor 104 may generate leakage inductance through the coupling with the surrounding medium such as air. As shown in FIG. 3, the leakage generated by the first inductor winding is defined as $L_{lk1}$; the leakage generated by the second inductor winding is defined as $L_{lk2}$; the leakage generated by the third inductor winding is defined as $L_{lk3}$. These three leakage inductances can be employed to replace the first inductor L1 shown in FIG. 2.

Figure 4:
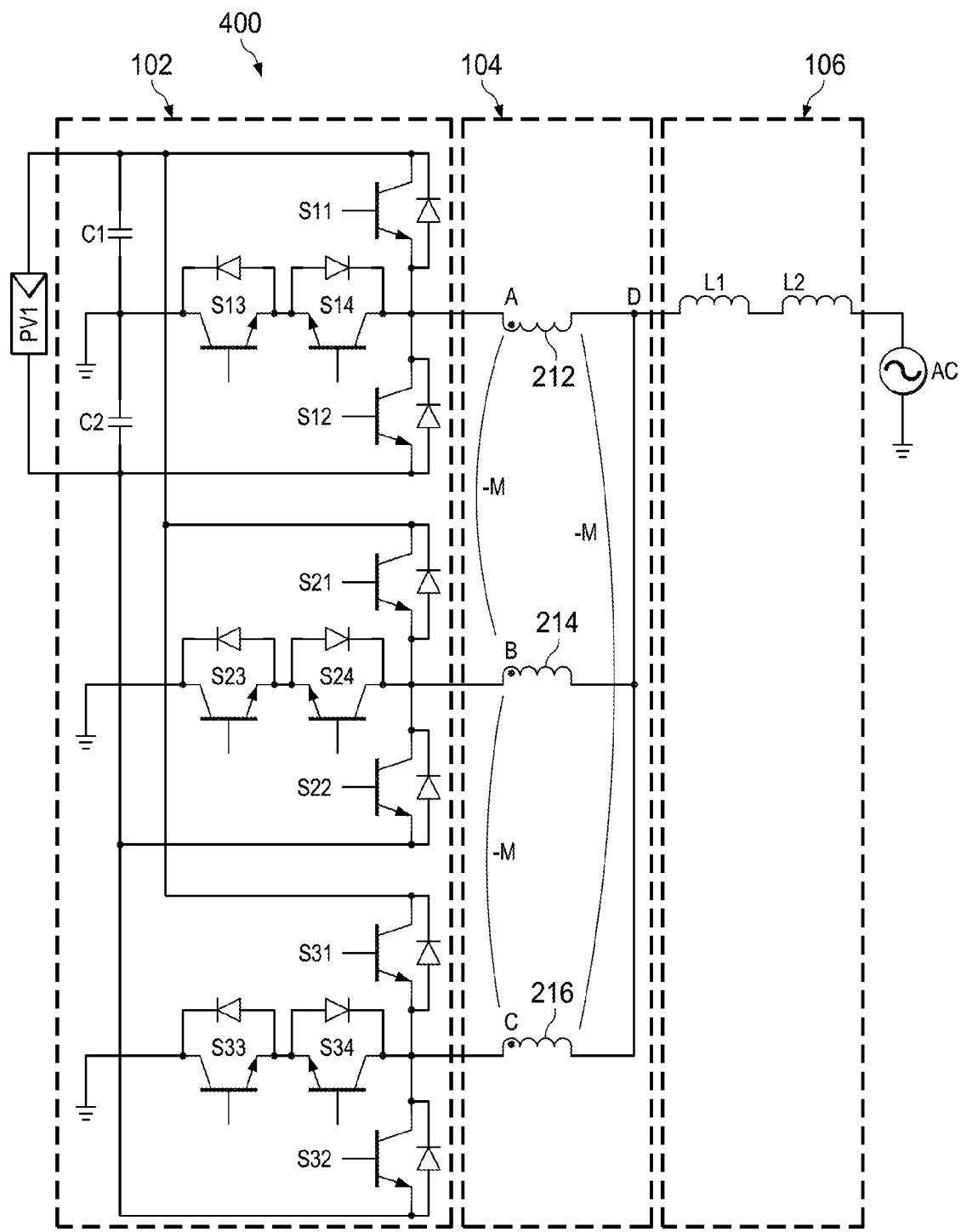
FIG. 4 illustrates schematic diagrams of a third implementation of the multi-channel inverter system shown in FIG. 1 in accordance with various embodiments of the present disclosure.

FIG. 4 illustrates schematic diagrams of a third implementation of the multi-channel inverter system shown in FIG. 1 in accordance with various embodiments of the present disclosure. The multi-channel inverter system 400 shown in FIG. 4 is similar to that shown in FIG. 2 except that the output capacitor C3 has been removed. One drawback of having an inductor-capacitor-inductor (LCL) filter shown in FIG. 2 is the LCL filter may lead to oscillation in the multi-channel inverter system 200. By increasing the inductance of the output filter (e.g., the inductance of L1 and/or L2 equal to 30 uH), the capacitor C3 may be removed and the multi-channel inverter system 400 may achieve the same harmonic elimination results (the current THD is equal to 1.8%) as the multi-channel inverter system 200 shown in FIG. 2.

One advantageous feature of removing the output capacitor C3 is the behavior of the multi-channel inverter system 400 is similar to a current source generating a current following a sinusoidal waveform. Such a current source does not have the oscillation issue occurred in the inverter system having the LCL filter.

Figure 5:
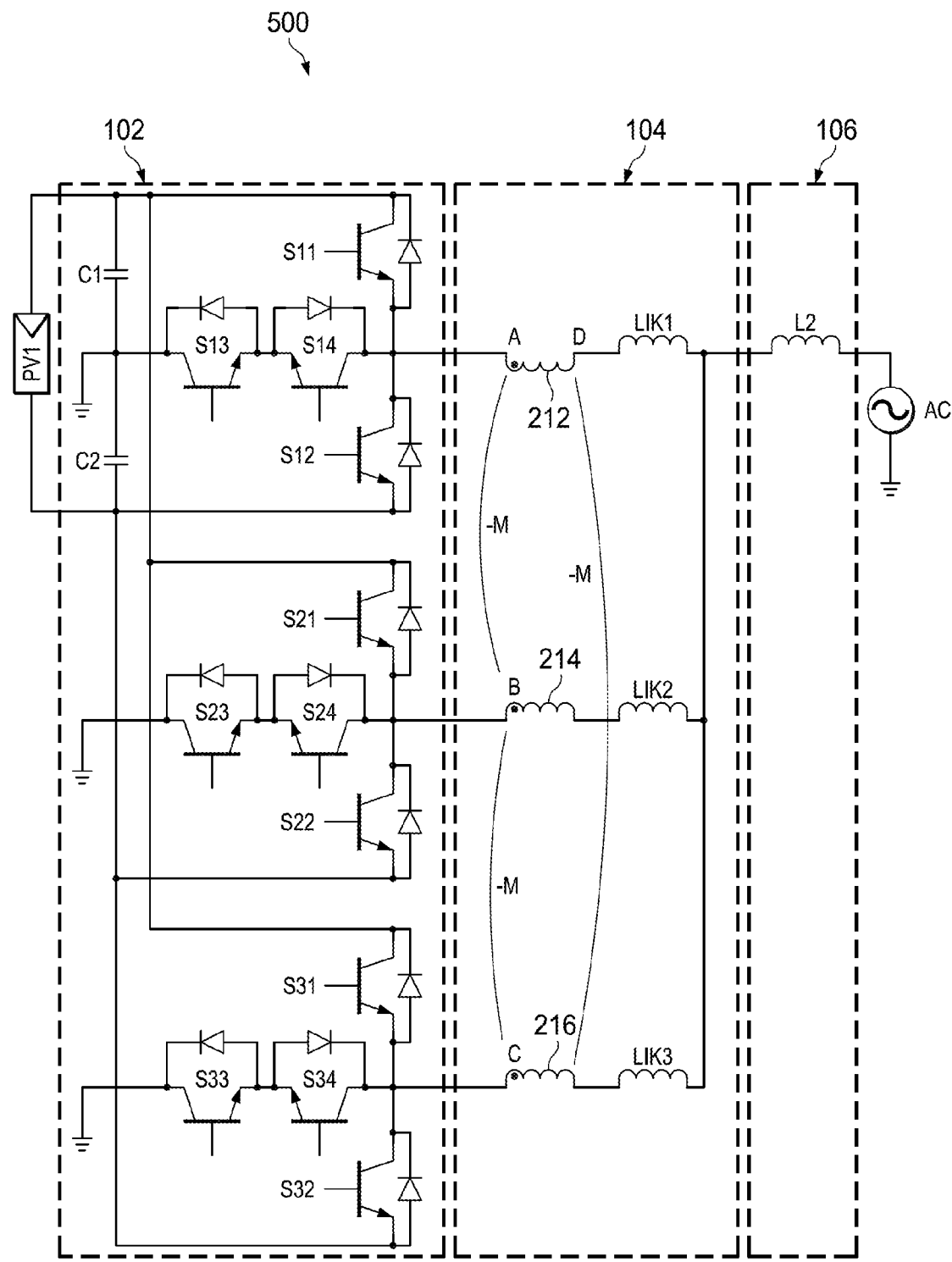
FIG. 5 illustrates schematic diagrams of a fourth implementation of the multi-channel inverter system shown in FIG. 1 in accordance with various embodiments of the present disclosure.

FIG. 5 illustrates schematic diagrams of a fourth implementation of the multi-channel inverter system shown in FIG. 1 in accordance with various embodiments of the present disclosure. The multi-channel inverter system 500 shown in FIG. 5 is similar to that shown in FIG. 4 except that the first inductor L1 has been replaced by the leakage inductance of the coupled inductor 104. The mechanism of integrating the first inductor L1 into the coupled inductor 104 has been described above in detail with respect to FIG. 3, and hence is not discussed again to avoid unnecessary repetition.

Figure 6:
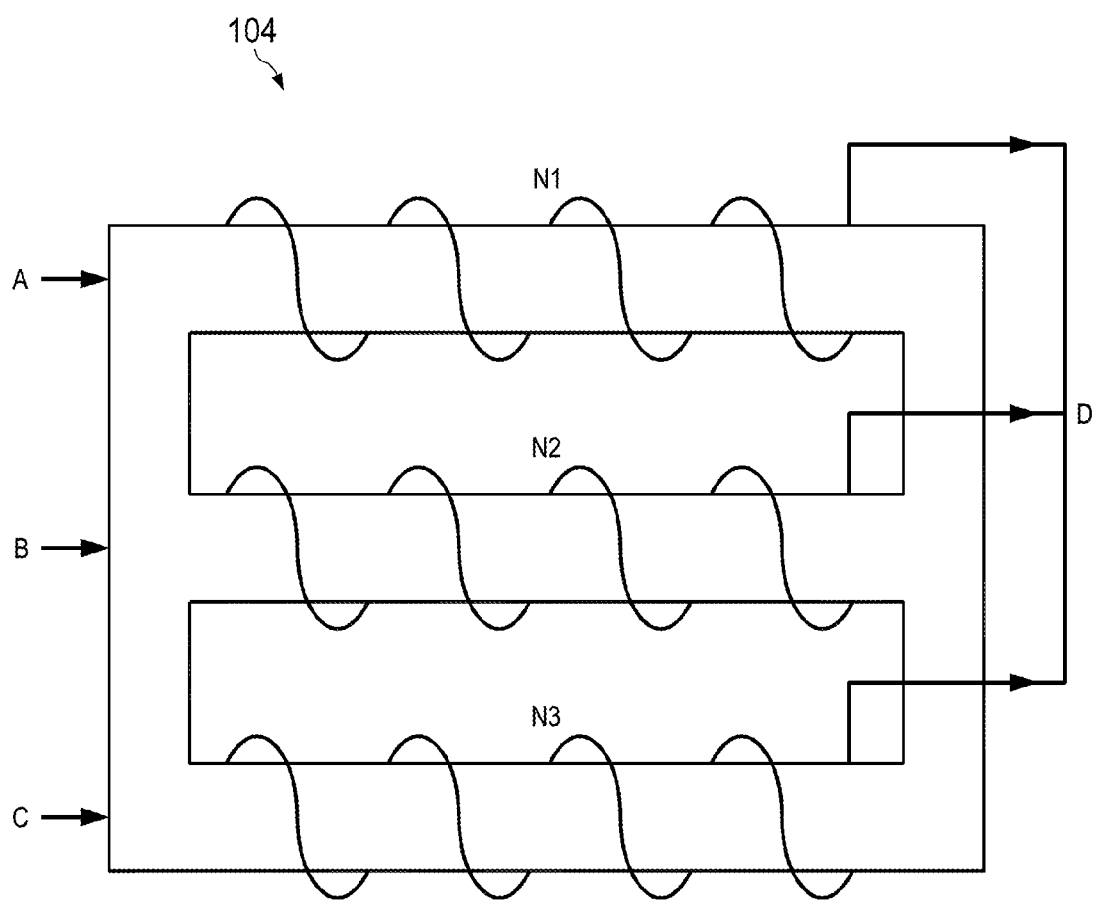
FIG. 6 illustrates an implementation of the coupled inductor shown in FIG. 1 in accordance with various embodiments of the present disclosure.

FIG. 6 illustrates an implementation of the coupled inductor shown in FIG. 1 in accordance with various embodiments of the present disclosure. The coupled inductor 104 may be wound around a magnetic core as shown in FIG. 6. In accordance with an embodiment, the magnetic core is made of a magnetic material having high permeability such as ferrite, powder iron, other power suitable materials, any combinations thereof and/or the like. Furthermore, the magnetic core may be made of suitable alloys such as silicon steel to further reduce the magnetic losses.

FIG. 6 shows the coupled inductor 104 comprises three winding coils N1, N2 and N3 wound around a magnetic core having three legs. The first winding coil N1 is wound around a first leg. The second winding coil N2 is wound around a second leg. The third winding coil N3 is wound around a third leg. As shown in FIG. 6, the second leg is between the first leg and the third leg. The input terminals of the coils N1, N2 and N3 are connected to terminals A, B and C respectively. The output terminals of the coils N1, N2 and N3 are connected together and further connected to the terminal D. It should be noted that coils N1, N2 and N3 are wound in the same direction. In other words, the magnetic fields generated by windings N1, N2 and N3 are in the same direction.

Figure 7:
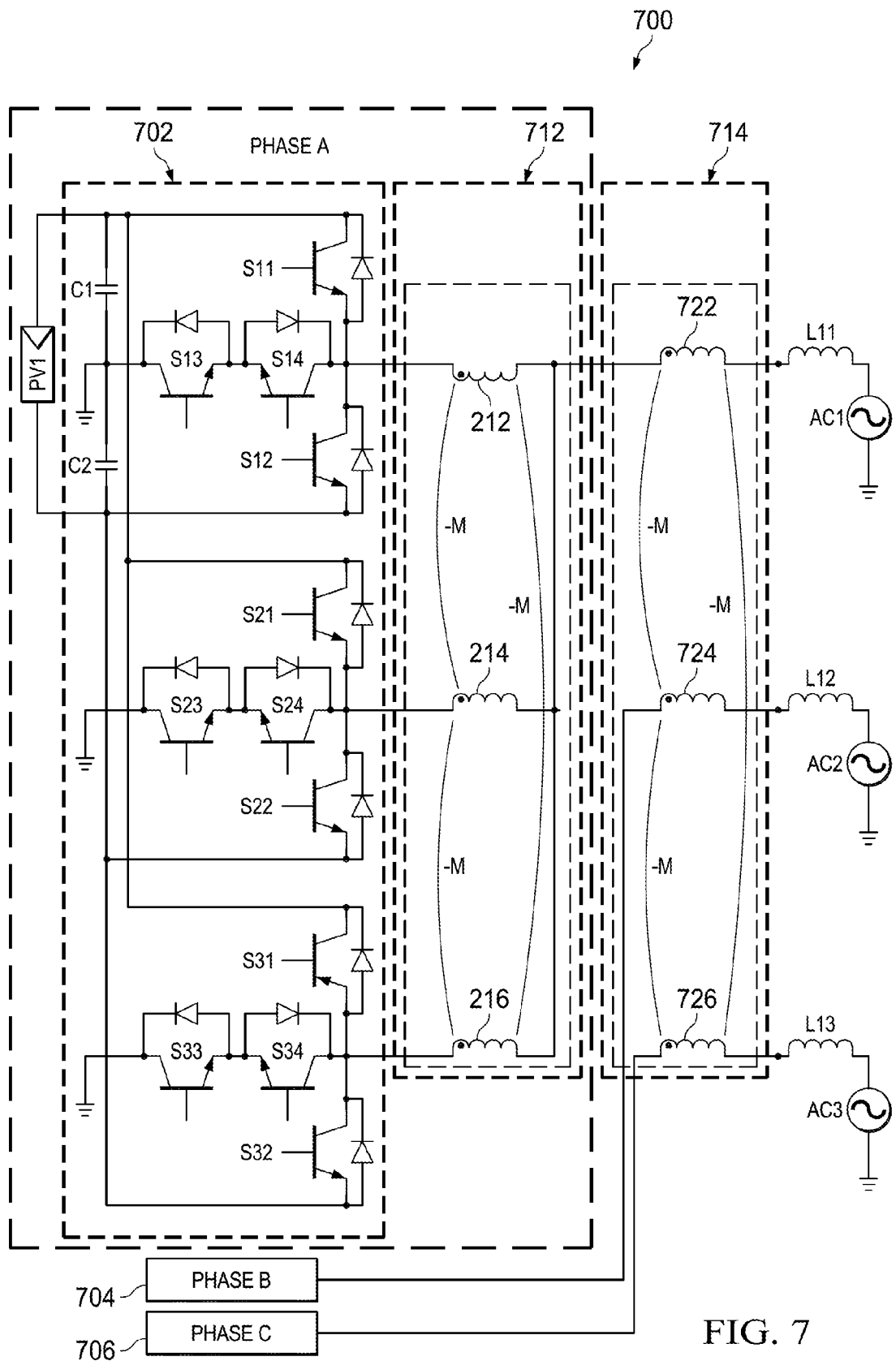
FIG. 7 illustrates a schematic diagram of a three-phase system comprising the multi-channel inverter system shown in FIG. 1 in accordance with various embodiments of the present disclosure.

FIG. 7 illustrates a schematic diagram of a three-phase system comprising the multi-channel inverter system shown in FIG. 1 in accordance with various embodiments of the present disclosure. The three-phase system 700 includes phase A, phase B and phase C. The structures of phase B and phase C are similar to that of phase A, and hence are not shown in detail in FIG. 7. In some embodiments, phase A may be implemented as a multi-channel inverter 702 having three inverter units. The three inverter units of phase A are connected together through a first coupled inductor 712. The operating principle of the multi-channel inverter 702 is similar to that of the multi-channel inverter system 200 shown in FIG. 2, and hence is not discussed again to avoid unnecessary repetition.

Phase A, phase B and phase C are connected together through a second coupled inductor 714. As shown in FIG. 7, the second coupled inductor 714 comprises windings 722, 724 and 726. The windings 722, 724 and 726 are connected to loads AC1, AC2 and AC3 respectively through their corresponding output inductors L11, L12 and L13. The structure of the second coupled inductor 714 is similar to that of the first coupled inductor 712, and hence is not discussed again herein.

FIG. 8 illustrates a multi-level waveform of the multi-channel inverter system shown in FIG. 2 in accordance with various embodiments of the present disclosure. FIG. 8 shows four waveforms. The first waveform is generated at the output of the first inverter unit 202. The second waveform is generated at the output of the second inverter unit 204. As shown in FIG. 8, there is a phase shift between the first waveform and the second waveform. The third waveform is generated at the output of the third inverter unit 206. As shown in FIG. 8, there is a phase shift between the second waveform and the third waveform. The fourth waveform is generated at the output of the coupled inductor 104. As shown in FIG. 8, the fourth waveform has seven levels. The seven-level waveform follows a sinusoidal waveform. As a result, the harmonic contents are less.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a first inverter comprising:
      a plurality of power processing channels coupled between an input dc power source and a first coupled inductor, wherein each channel is configured to invert a dc waveform into an ac waveform with a phase shift equal to 360 degrees divided by N, wherein N is an odd integer;
      the first coupled inductor comprising a plurality of windings, wherein:
         each winding has a first terminal connected to a corresponding power processing channel; and
         second terminals of the plurality of windings are connected together; and
      an output filter having an input connected to the second terminals of the plurality of windings.

2. The system of claim 1, wherein the first coupled inductor comprises:
   a magnetic core comprising a first leg, a second leg and a third leg;
   a first winding of the first coupled inductor wound around the first leg;
   a second winding of the first coupled inductor wound around the second leg; and
   a third winding of the first coupled inductor wound around the third leg.

3. The system of claim 2, wherein:
   the first winding of the first coupled inductor and the second winding of the first coupled inductor are wound in a same direction; and
   the second winding of the first coupled inductor and the third winding of the first coupled inductor are wound in a same direction.

4. The system of claim 1, wherein:
   the windings of the first coupled inductor are negatively coupled to each other.

5. The system of claim 1, wherein:
   each power processing channel is a three-level T-type inverter.

6. The system of claim 5, wherein the three-level T-type inverter comprises:
   a first switch and a second switch connected in series between two terminals of the input dc power source; and
   a third switch and a fourth switch connected back-to-back between a common node of the first switch and the second switch, and a neutral point.

7. The system of claim 1, wherein:
   the output filter comprises an output capacitor directly connected to a terminal of the first coupled inductor.

8. The system of claim 1, further comprising:
   a second inverter coupled between the input dc power source and a second coupled inductor;
   a third inverter coupled between the input dc power source and a third coupled inductor; and
   a fourth coupled inductor having a first input connected to an output terminal of the first coupled inductor, a second input connected to an output terminal of the second coupled inductor, a third input connected to an output terminal of the third coupled inductor.

9. The system of claim 8, wherein:
   the second coupled inductor and the third coupled inductor have a same structure as the first coupled inductor.

10. A system comprising:
    a first T-type inverter connected to a dc power source;
    a second T-type inverter connected to the dc power source, wherein the second T-type inverter is configured to operate with a first phase shift from the first T-type inverter;
    a third T-type inverter connected to the dc power source, wherein the third T-type inverter is configured to operate with a second phase shift from the second T-type inverter;
    a coupled inductor having a first input, a second input and a third input connected to the first T-type inverter, the second T-type inverter and the third T-type inverter respectively, wherein the coupled inductor comprises:
       a magnetic core comprising a first leg, a second leg and a third leg;
       a first winding wound around the first leg;
       a second winding wound around the second leg; and
       a third winding wound around the third leg, wherein output terminals of the first winding, the second winding and the third winding are connected together to form an output of the coupled inductor; and
    an output filter coupled to the output of the coupled inductor.

11. The system of claim 10, wherein:
    the first winding is negatively coupled to the second winding;
    the second winding is negatively coupled to the third winding; and the third winding is negatively coupled to the first winding.

12. The system of claim 10, wherein:
the output filter is connected between the coupled inductor and an ac source.

13. The system of claim 12, wherein:
the output filter comprises an output capacitor and an output inductor, and wherein:
   the output inductor is connected between the coupled inductor and the ac source; and
   the output capacitor is connected to a common node of the output inductor and the coupled inductor.

14. The system of claim 10, wherein the first T-type inverter comprises:
a first switching element;
a second switching element, wherein:
   the second switching element and the first switching element are connected in series; and
   a common node of the first switching element and the second switching element is an output of the first T-type inverter; and
a first isolation switch comprising two back-to-back connected switching elements, wherein the first isolation switch is coupled between the output of the first T-type inverter and ground.

15. The system of claim 10, wherein:
the first phase shift is equal to 360 degrees divided by N, and wherein N is an odd integer.

16. The system of claim 10, wherein:
the second phase shift is equal to the first phase shift.

17. A three-phase inverter system comprising:
a first phase comprising a plurality of first inverters connected together through a first coupled inductor, wherein:
   the first coupled inductor comprises a plurality of first windings negatively coupled to each other; and
   the plurality of first inverters are configured to operate with a phase shift from one another;
a second phase comprising a plurality of second inverters connected together through a second coupled inductor;
a third phase comprising a plurality of third inverters connected together through a third coupled inductor; and
a fourth coupled inductor having a first winding connected between the first coupled inductor and a first output filter, a second winding connected between the second coupled inductor and a second output filter and a third winding connected between the third coupled inductor and a third output filter.

18. The three-phase inverter system of claim 17, wherein:
the first winding of the fourth coupled inductor is negatively coupled to the second winding of the fourth coupled inductor;
the second winding of the fourth coupled inductor is negatively coupled to the third winding of the fourth coupled inductor; and
the third winding of the fourth coupled inductor is negatively coupled to the first winding of the fourth coupled inductor.

19. The three-phase inverter system of claim 17, wherein:
the first inverters are three-level T-type inverters.

20. The three-phase inverter system of claim 17, wherein the fourth coupled inductor comprises:
a magnetic core comprising a first leg, a second leg and a third leg;
a first winding wound around the first leg;
a second winding wound around the second leg; and
a third winding wound around the third leg.

* * * * *